United States Patent
Cam

(10) Patent No.: US 9,912,683 B2
(45) Date of Patent: Mar. 6, 2018

(54) METHOD AND APPARATUS FOR DETERMINING A CRITICALITY SURFACE OF ASSETS TO ENHANCE CYBER DEFENSE

(71) Applicant: U.S. Army Research Laboratory ATTN: RDRL-LOC-I, Adelphi, MD (US)

(72) Inventor: Hasan Cam, Falls Church, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 805 days.

(21) Appl. No.: 14/247,566

(22) Filed: Apr. 8, 2014

(65) Prior Publication Data
US 2016/0248794 A1    Aug. 25, 2016

Related U.S. Application Data

(60) Provisional application No. 61/810,284, filed on Apr. 10, 2013.

(51) Int. Cl.
*H04L 29/06* (2006.01)

(52) U.S. Cl.
CPC .................. *H04L 63/1433* (2013.01)

(58) Field of Classification Search
CPC ... H04L 63/1433; H04L 41/142; H04L 41/16; H04L 63/1416; H04L 63/20; H04L 63/08; H04L 63/1458; H04L 67/10; H04L 63/0263; G06F 21/577; G06F 2221/034; G06F 21/57; F01K 13/02; G06Q 10/10; G06Q 10/0635; G06Q 10/06393; G06N 99/005; G06N 7/005

See application file for complete search history.

(56) References Cited

U.S. PATENT DOCUMENTS

| | | | |
|---|---|---|---|
| 7,472,421 B2 | 12/2008 | Cummins | |
| 7,529,195 B2 * | 5/2009 | Gorman | H04L 41/00 370/254 |
| 7,594,270 B2 | 9/2009 | Church et al. | |

(Continued)

OTHER PUBLICATIONS

The ICSJWG Roadmap Working Group, "Cross-Sector Roadmap for Cybersecurity of Control Systems", *US-CERT*, Sep. 30, 2011.

(Continued)

*Primary Examiner* — Saleh Najjar
*Assistant Examiner* — Shu Chun Gao
(74) *Attorney, Agent, or Firm* — Eric Brett Compton

(57) ABSTRACT

A method and apparatus is provided for determining aggregated value of risk and resilience metrics of critical nodes in a network of computer nodes, comprising determining a status of each node in a plurality of nodes, computing one or more effectiveness attributes for each node in the plurality of nodes, ranking the plurality of nodes based upon at least the one or more effectiveness attributes of each node, determining one or more nodes as critical nodes based on the ranking and computing a criticality surface of the one or more critical nodes as the aggregated value of risk and resilience metrics, wherein the criticality surface is an aggregation of the one or more effectiveness attribute for each of the one or more critical nodes.

19 Claims, 13 Drawing Sheets

(56) References Cited

U.S. PATENT DOCUMENTS

| | | | | |
|---|---|---|---|---|
| 7,765,319 B1* | 7/2010 | Gorman | ............... | H04L 41/12 370/351 |
| 8,015,430 B1 | 9/2011 | Rakic et al. | | |
| 8,135,830 B2 | 3/2012 | McClure et al. | | |
| 8,201,257 B1* | 6/2012 | Andres | ................... | G06F 21/56 726/23 |
| 8,255,262 B2* | 8/2012 | Siegel | ............... | G06Q 10/0635 705/7.28 |
| 8,272,061 B1* | 9/2012 | Lotem | ................... | G06F 21/577 709/223 |
| 9,032,531 B1* | 5/2015 | Scorvo | ................... | G06F 21/55 726/25 |
| 2003/0093514 A1* | 5/2003 | Valdes | ................. | H04L 41/142 709/224 |
| 2005/0065807 A1* | 3/2005 | DeAngelis | ......... | G06Q 10/0635 705/7.28 |
| 2007/0006315 A1* | 1/2007 | Bushnaq | ............... | G06T 11/206 726/25 |
| 2007/0067847 A1* | 3/2007 | Wiemer | ................ | G06F 21/577 726/25 |
| 2007/0169194 A1* | 7/2007 | Church | ................. | G06F 21/552 726/23 |
| 2010/0043074 A1* | 2/2010 | Scates | ................... | G06F 21/577 726/25 |
| 2010/0115601 A1* | 5/2010 | Brandstetter | ......... | G06F 21/577 726/11 |
| 2010/0153156 A1* | 6/2010 | Guinta | ................... | G06Q 10/10 705/7.28 |
| 2010/0306372 A1* | 12/2010 | Gorman | ................. | H04L 41/12 709/224 |
| 2012/0224057 A1* | 9/2012 | Gill | ........................ | G06F 21/55 348/143 |
| 2013/0104236 A1* | 4/2013 | Ray | .................... | H04L 63/1408 726/25 |
| 2014/0137257 A1* | 5/2014 | Martinez | ............... | G06F 21/577 726/25 |
| 2014/0173739 A1* | 6/2014 | Ahuja | ................... | G06F 21/577 726/25 |

OTHER PUBLICATIONS

Common Vulnerability Scoring System (CVSS—SIG), http://www.first.org/cvss, © 2007 by First .Org., Inc.

K. Scarfone and P. Mell, "An Analysis of CVSS Version 2 Vulnerability Scoring", Proc. of IEEE Third Int. Symposium on Empirical Software Engineering and Measurement, 2009.

M. Bozorgi, L.K. Saul, S. Savage and G.M. Voelker, "Beyond Heuristics: Learning to Classify Vulnerabilities and Predicting Exploits", Proc. of the Sixteenth ACM Conference on Knowledge Discovery and Data Mining (KDD-10), Washington, D.C., Jul. 2010.

M. Frigault, L. Wang, A. Singhal and S. Jajodia, "Measuring Network Security Using Dynamic Bayesian Network", Proc. of QoP'08, Oct. 27, 2008.

C. Wang, Y. Wang, Y. Dong and T. Zhang, "A Novel Comprehensive Network Security Assessment Approach", Proc. of IEEE ICC, 2011.

Y.Y. Wee, W.P. Cheah, S.C. Tan and K.K. Wee, "Causal Discovery and Reasoning for Intrusion Detection Using Bayesian Network", Int. J. of Machine Learning and Computing, vol. 1, No. 2, Jun. 2011.

Y.-Y. Liu, J.-J. Slotine and A.-L. Barbasi, "Controllability of complex networks", Nature, 2011.

L. Wang, T. Islam, T. Long, A. Singhal and S. Jajodia, "An attack graph-based probabilistic security metric." In Proceedings of the 22nd Annual IFIP WG 11.3 Working Conference on Data and Applications Security (DBSEC '08), 2008.

D. Heckerman, "A Tutorial on Learning With Bayesian Networks," Technical Report, MSR-TR-95-06, Microsoft Corporation, Redmond, WA, 1996.

J.P.G. Sterbenz, E.K. Cetinkaya, M.A. Hameed, A. Jabbar, and J.P. Rohrer, "Modelling and Analysis of Network Resilience," IEEE Third Int. Conf. on Communication Systems and Networks, Bangalore, India, 2011.

M. Burkhart, "Enabling Collaborative Network Security with Privacy-Preserving Data Aggregation", Ph.D. Thesis, ETH Zurich, 2011.

H. çam, "Rearrangeability of (2n-1)-Stage Shuffle-Exchange Networks," SIAM Journal on Computing, vol. 32, No. 3, Mar. 2003, pp. 557-585.

Mei-Tai Chu, Joseph Shyu, Gwo-Hshiung Tzeng, and Rajiv Khosla, "Comparison among three analytical methods for knowledge communities group-decision analysis," Expert Systems with Applications, vol. 33, pp. 1011-1024, 2007.

Subrata Chakraborty and Chung-Hsing Yeh, "A simulation based comparitive study of normalization procedures in multiattribute decision making," in 6th WSEAS Intl. Conference on Artificial Intelligence,Knowledge Engineering and Databases, Corfu Island, Greece, 2007.

A. Kim and M.H. Kang, "Determining Asset Criticality for Cyber Defense," Technical Report, Naval Research Laboratory, Sep. 23, 2011.

A. Motskin, I. Downes, B. Kusy, O. Gnawali, L. Guibas, "Network Warehouses: Efficient Information Distribution to Mobile Users," Proc. of the 30th IEEE International Conference on Computer Communications (INFOCOM 2011), Apr. 2011. J. Gao, L.J. Guibas, N. Milosavljevic, and D. Zhou, "Distributed Resource Management and Matching in Sensor Networks," Proc. of the 8th International Symposium on Information Processing in Sensor Networks (IPSN'09), 97-108, Apr. 2009.

J. Gao, L.J. Guibas, N. Milosavljevic, and D. Zhou, "Distributed Resource Management and Matching in Sensor Networks," Proc. of the 8th International Symposium on Information Processing in Sensor Networks (IPSN'09), 97-108, Apr. 2009.

Y. Bartal, "Probabilistic approximation of metric spaces and its algorithmic applications," Proc. of FOCS, pp. 184-193, 1996.

J. Fakcharoenphol, S. Rao, and K. Talwar, "A tight bound on approximating arbitrary metrics by tree metrics," Proc. of STOC, pp. 448-455, 2003.

"An Introduction to Computer Security—The NIST Handbook," Technical Report, NIST, Special Publication 800-12, Oct. 1995.

S. Fenz, "An Ontology- and Bayesian-based Approach for Determining Threat Probabilities," Proc. of ASIACCS'11, Mar. 22-24, 2011, Hong Kong, China.

Hasan Cam, "PeerShield: Determining Control and Resilience Criticality of Collaborative Cyber Assets in Networks," Cyber Sensing 2012, SPIE Defense, Security, and Sensing, Apr. 23-27, 2012. Baltimore, MD, USA (Presentation given Apr. 25, 2012; Paper submitted to conference on May 1, 2012).

Hasan Cam, "Risk, Resilience, and Criticality Surface Management in Tactical Cloud Computing Environment", ARO (Army Research Office) Cloud Computing Workshop, Mar. 10-12, 2013, George Mason University. (Presentation given on Mar. 12, 2013).

N. Poolsappasit, R. Dewri, and I. Ray, "Dynamic Security Risk Management Using Bayesian Attack Graphs," IEEE Trans. on Dependable and Secure Computing, vol 9, No. 1, Jan./Feb. 2012.

O. Erdene-Ochir, A. Kountouris, M. Minier, and F. Valois, "A New Metric to Quantify Resiliency in Networking," IEEE Communications Letters, vol. 16, No. 10, Oct. 2012.

L. Gallon and J-J. Bascou, "CVSS Attack Graphs," Proc. of IEEE 2011 Seventh Int. Conf on Signal/mage Technology&Internet Based Systems, 2011.

T.W. Manikas, M.A. Thornton, "Using Multiple-Valued Logic Decision Diagrams to Model System Threat Probabilities," Pro c. of 2011 41st IEEE International Symposium on Multiple-Valued Logic.

* cited by examiner

CPT FOR A

| P(A) | |
|---|---|
| T | F |
| 0.20 | 0.80 |

CPT FOR B

| P(B) | |
|---|---|
| T | F |
| 0.15 | 0.85 |

CPT FOR C

| P(C) | |
|---|---|
| T | F |
| 0.15 | 0.85 |

CPT FOR D

| P(D) | |
|---|---|
| T | F |
| 0.25 | 0.75 |

CPT FOR I

| P(I) | |
|---|---|
| T | F |
| 0.30 | 0.70 |

CPT FOR H

| G | P(H\|G) | |
|---|---|---|
|   | T | F |
| F | 0.00 | 1.00 |
| T | 0.25 | 0.75 |

CPT FOR E

| A | B | P(E\|A,B) | |
|---|---|---|---|
|   |   | T | F |
| F | F | 0.00 | 1.00 |
| F | T | 0.25 | 0.75 |
| T | F | 0.30 | 0.70 |
| T | T | 0.48 | 0.52 |

CPT FOR F

| C | D | P(F\|C,D) | |
|---|---|---|---|
|   |   | T | F |
| F | F | 0.00 | 1.00 |
| F | T | 0.30 | 0.70 |
| T | F | 0.20 | 0.80 |
| T | T | 0.44 | 0.56 |

CPT FOR G

| E | F | P(G\|E,F) | |
|---|---|---|---|
|   |   | T | F |
| F | F | 0.00 | 1.00 |
| F | T | 0.15 | 0.85 |
| T | F | 0.20 | 0.80 |
| T | T | 0.32 | 0.68 |

CPT FOR J

| H | I | P(J\|H,I) | |
|---|---|---|---|
|   |   | T | F |
| F | F | 0.00 | 1.00 |
| F | T | 0.95 | 0.05 |
| T | F | 0.15 | 0.85 |
| T | T | 0.30 | 0.70 |

FIG. 5B

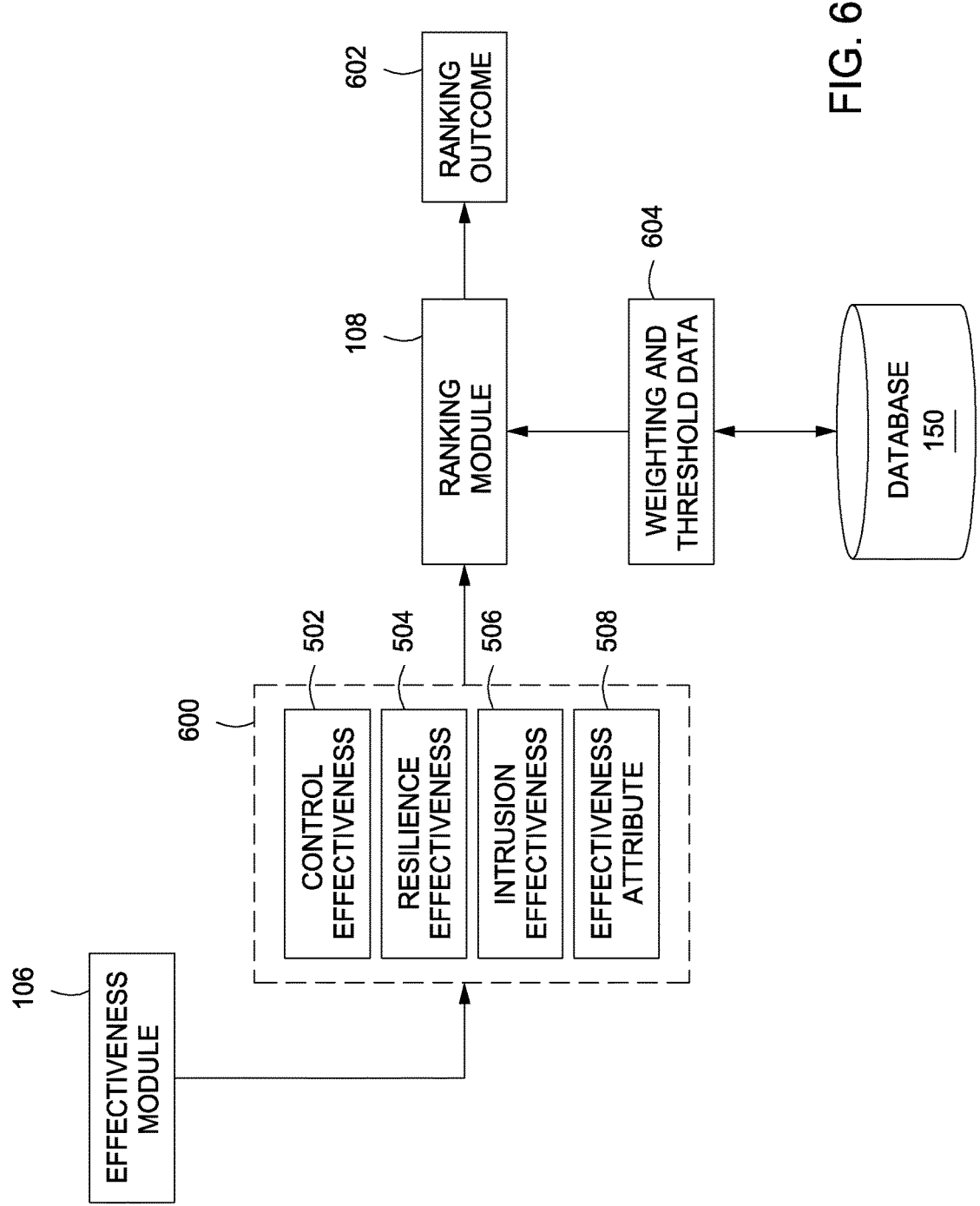

METHOD AND APPARATUS FOR DETERMINING A CRITICALITY SURFACE OF ASSETS TO ENHANCE CYBER DEFENSE

RELATED APPLICATIONS

This application claims the benefit of U.S. Provisional Application No. 61/810,284 filed on Apr. 10, 2013, which is herein incorporated by reference in its entirety.

GOVERNMENT INTEREST

Governmental Interest—The invention described herein may be manufactured, used and licensed by or for the U.S. Government.

FIELD OF INVENTION

Embodiments of the present invention generally relate to assessing cyber security and, more particularly, to a method and apparatus for determining a criticality surface of assets to enhance cyber defense.

BACKGROUND OF THE INVENTION

Modern computer networks often have several layers of security to protect from cyber-attacks, viruses and the like. However, as attackers become more coordinated and advanced in such attacks, the security layers such as firewalls, intrusion detection systems, encryption and the like are required to have much more effectiveness to protect valuable assets on systems internal to the network, i.e., network nodes such as computer workstations, routers, switches and servers. Such a requirement makes it essential to take a comprehensive and objective approach to measuring the individual and relative performances of cyber security assets in network nodes.

Therefore there is a need in the art for techniques that measure individual and cumulative criticalities of cyber security assets in network nodes and then determine their criticality surface to enhance cyber defense.

BRIEF SUMMARY OF THE INVENTION

Embodiments of the present invention relate to a method and apparatus for determining the aggregated value of risk and resilience metrics of critical nodes in a network of computer nodes, comprising determining a status of each node in a plurality of nodes, computing one or more effectiveness attributes for each node in the plurality of nodes, ranking the plurality of nodes based upon at least the effectiveness attributes of each node, determining one or more nodes as critical nodes and computing a criticality surface of the one or more critical nodes as the aggregated value of risk and resilience metrics, wherein the criticality surface is an aggregation of the one or more effectiveness attribute for each of the one or more critical nodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5B illustrates the conditional probability tables (CPT) of all random variables for a single network node from the plurality of nodes in accordance with exemplary embodiments of the present invention;

FIG. 6 depicts a block diagram of the ranking module in accordance with exemplary embodiments of the present invention;

DETAILED DESCRIPTION OF THE INVENTION

Embodiments of the present invention are directed towards a method and apparatus for determining criticality surface of assets in a plurality of nodes. In one embodiment, the protocol for security control, resilience, and controllability collaboration (CRCC) is presented to calculate critical nodes in a network of nodes. Determining the critical nodes allows for administrators to determine which nodes to focus resilience and recovery on after an attack or to prevent attacks in the future. The present invention computes a criticality surface via the CRCC by determining the status of a plurality of nodes and their assets, computing their effectiveness, ranking the assets and then determining the critical nodes from the plurality of nodes.

Figure 1:
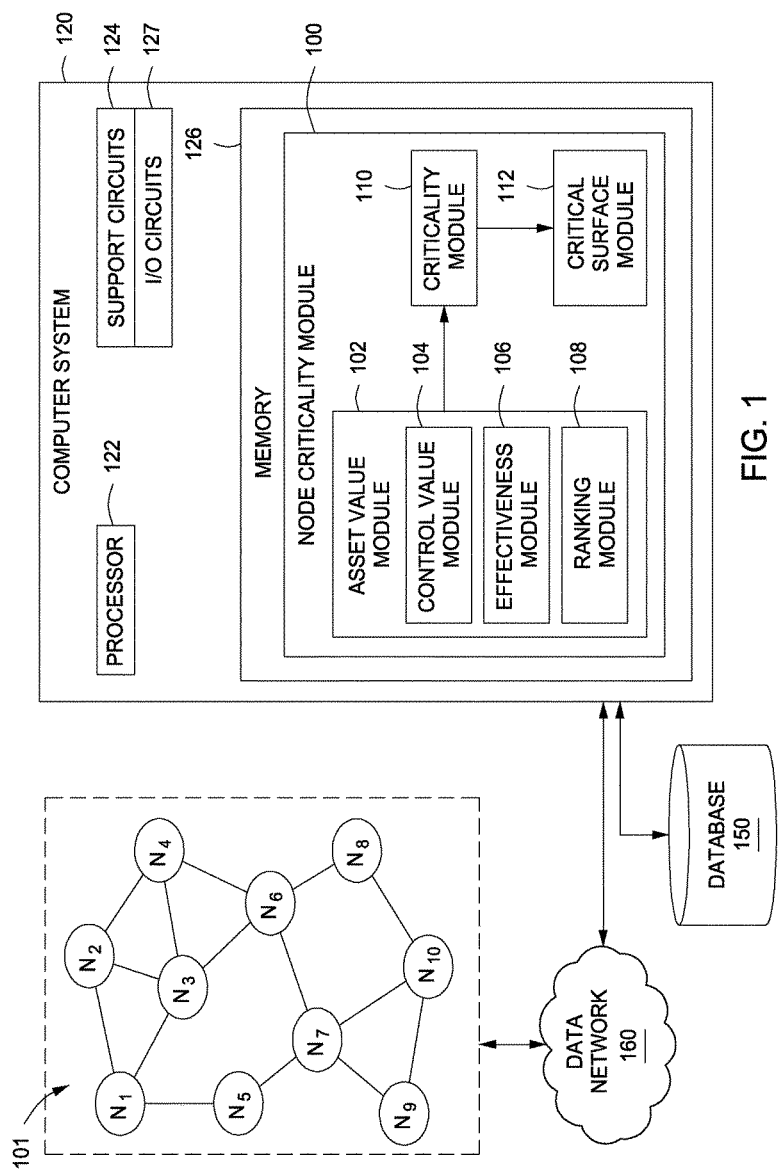
FIG. 1 depicts a block diagram of a node criticality module in accordance with exemplary embodiments of the present invention.

The term "node" refers to any active device (e.g., host machine, server, switch, or the like) attached to a computer network or telecommunication network. A cyber "asset" of a node refers to programmable devices, data, processes, software, hardware, and networks that are located in a network node. Similarly, the term cyber "control" of a node includes firewalls, intrusion detection system (IDS), scanner, monitoring, policy, encryption and key management, password management, or any other cyber defense/protect mechanism that is known to those of ordinary skill in the art to be available in a network node. The term "critical node" is a node which is considered critical to the security of the network as a whole, e.g., a node which, if compromised by a cyber-attack, could significantly impact the security of the other nodes in the network, or could be used to attack other nodes in the network. Once critical nodes are determined, security assessments can be made by administrators of the network to protect the critical nodes. The term "criticality surface" is an aggregation of the one or more effectiveness attribute for each of the one or more critical nodes FIG. 1 depicts a block diagram of a node criticality module 100 in accordance with exemplary embodiments of the present invention. The node criticality module 100 determines which nodes in a network of nodes 101 are critical nodes. Those of ordinary skill in the art will recognize that the nodes 101 may be a network of computer systems such as host systems, routers, switches, and the like, where each system contains one or more assets such as software assets and hardware assets. The nodes 101 may also represent the interconnected dependencies between assets of a single host system. According to embodiments of the present invention, the node criticality module 100 can operate on a single host system, or a network of computer systems to determine the criticality surface. Each module of the node criticality module 100 may operate on a single node and its associated assets, or may operate on a network of nodes, e.g., a network of computer systems coupled together physically or virtually.

Once an understanding of the weaknesses, strengths and criticalities of each node is determined, the node criticality module 100 enables an administrator, analyst, or the like to make an accurate assessment of and dynamic protection against cyber-attacks. The node criticality module 100 comprises an asset value module 102, a criticality module 110 and a critical surface module 112. The asset value module 102 comprises a control value module 104, an effectiveness module 106 and a ranking module 108. The asset value module 102 determines asset value for each node in the network of nodes 101. The asset values are then output to the criticality module 110, which determines the ranking of each node based on their asset value. Finally, a criticality surface is produced by coupling the ranking of nodes to the critical surface module 112, where the criticality surface is a computation of the aggregated value of all those metrics that are considered important in determining criticality of assets over networks. The computation is described in detailed with respect to FIGS. 6 and 7.

The control value module 104 computes weighted asset values for each node in the plurality of nodes 101. The weighted asset values represent the vulnerability and operational status of hosts and cyber assets of each of the nodes. The effectiveness module 106 computes the effectiveness with respect to various attributes for each of the plurality of nodes 101. According to one embodiment, the attributes comprise at least control effectiveness, resilience effectiveness and intrusion effectiveness. The effectiveness module 106 computes the effectiveness based on the weighted asset values from the control value module 104 using a Bayesian network as shown in and described with respect to FIG. 5. The ranking module 108 determines the ranking of cyber assets by considering the control, resilience and intrusion asset values of each node. The ranking module 108 is further shown in and described with respect to FIG. 6. The criticality module 110 determines the one or more critical nodes from the nodes 101 with respect to network connectivity and the attributes of resilience, control and influence by using an enhanced version of the hierarchically well-separated tree (HWST) whose flowchart is illustrated in FIG. 9, though those of ordinary skill will recognize that other means may be used. Finally, the critical surface module 112 computes the criticality surface for cyber assets to obtain the aggregated value of risk and resilience metrics for each of the one or more (critical) nodes, as shown in and described with respect to FIG. 7 and FIGS. 8A-8D.

According to exemplary embodiments, the node criticality module 100 may be implemented as a software module by a computer such as computer system 120 shown in FIG. 1. Those of ordinary skill in the art will recognize that the computer system 120 may be coupled to the nodes 101 via data network 160, or, in some embodiments, may be one of the nodes 101. The computer system 120 monitors the plurality of nodes 101 and executes the node criticality module 100 upon demand or on a scheduled basis to determine the criticality surface of nodes $N_1$ to $N_{10}$. In some instances, the node criticality module 100 is automatically executed when nodes are added or removed from the plurality of nodes 101.

The input for the CRCC protocol is: conditional probability tables and dependency relationships of cyber assets, inventory of security control and resilience mechanisms at each asset or node, and topology information of network. The output of the CRCC protocol is: Quantifying criticality surface, risk and resilience of cyber assets, ranking cyber assets and identifying critical assets and nodes, each comprising various types and number of assets. The CRCC comprises, in overview, the steps of (1) determining vulnerability and operational status of hosts and cyber assets, (2) Computing the individual control effectiveness and resilience of cyber assets, along with their risk, by representing them with additional random variables in a Bayesian network computing risk only, (3) Determine ranking of cyber assets by considering control, resilience, and influence asset values of each node by improving the decision-making technique TOPSIS, (4) Determine the critical nodes of network with respect to network connectivity and the attributes of resilience, control, and influence by introducing an enhanced Hierarchically Well-Separated Tree and (5) Compute criticality surface of cyber assets to obtain the aggregated value of risk and resilience metrics.

The computer system 120 comprises a processor 122, various support circuits 124, and memory 126. The processor 122 may include one or more microprocessors known in the art. The support circuits 124 for the processor 122 include conventional cache, power supplies, clock circuits, data registers, I/O interface 127, and the like. The I/O interface 127 may be directly coupled to the memory 126 or coupled through the support circuits 124. The I/O interface 127 may also be configured for communication with input devices and/or output devices such as network devices, various storage devices, mouse, keyboard, display, video and audio sensors, IMU, RF receivers and RF transmitters or the like. Those of ordinary skill in the art will recognize that the computer system 120 may be coupled to other computer systems to form a larger computer network.

The memory 126, or a computer readable medium, stores non-transient processor-executable instructions and/or data that may be executed by and/or used by the processor 122. These processor-executable instructions may comprise firmware, software, and the like, or some combination thereof. Modules having processor-executable instructions that are stored in the memory 126 comprise a node criticality module 100. The node criticality module 100 further comprises an asset value module 102, a criticality module 110 and a critical surface module 112. The asset value module 102 further comprises a control value module 104, an effectiveness module 10 and a ranking module 108.

The computer system 120 may be programmed with one or more operating systems, which may include OS/2, Java Virtual Machine, Linux, SOLARIS, UNIX, HPUX, AIX, WINDOWS, IOS, and ANDROID among other known platforms. The memory 126 may include one or more of the following random access memory, read only memory, magneto-resistive read/write memory, optical read/write memory, cache memory, magnetic read/write memory, and the like, as well as signal-bearing media as described below.

Figure 2:
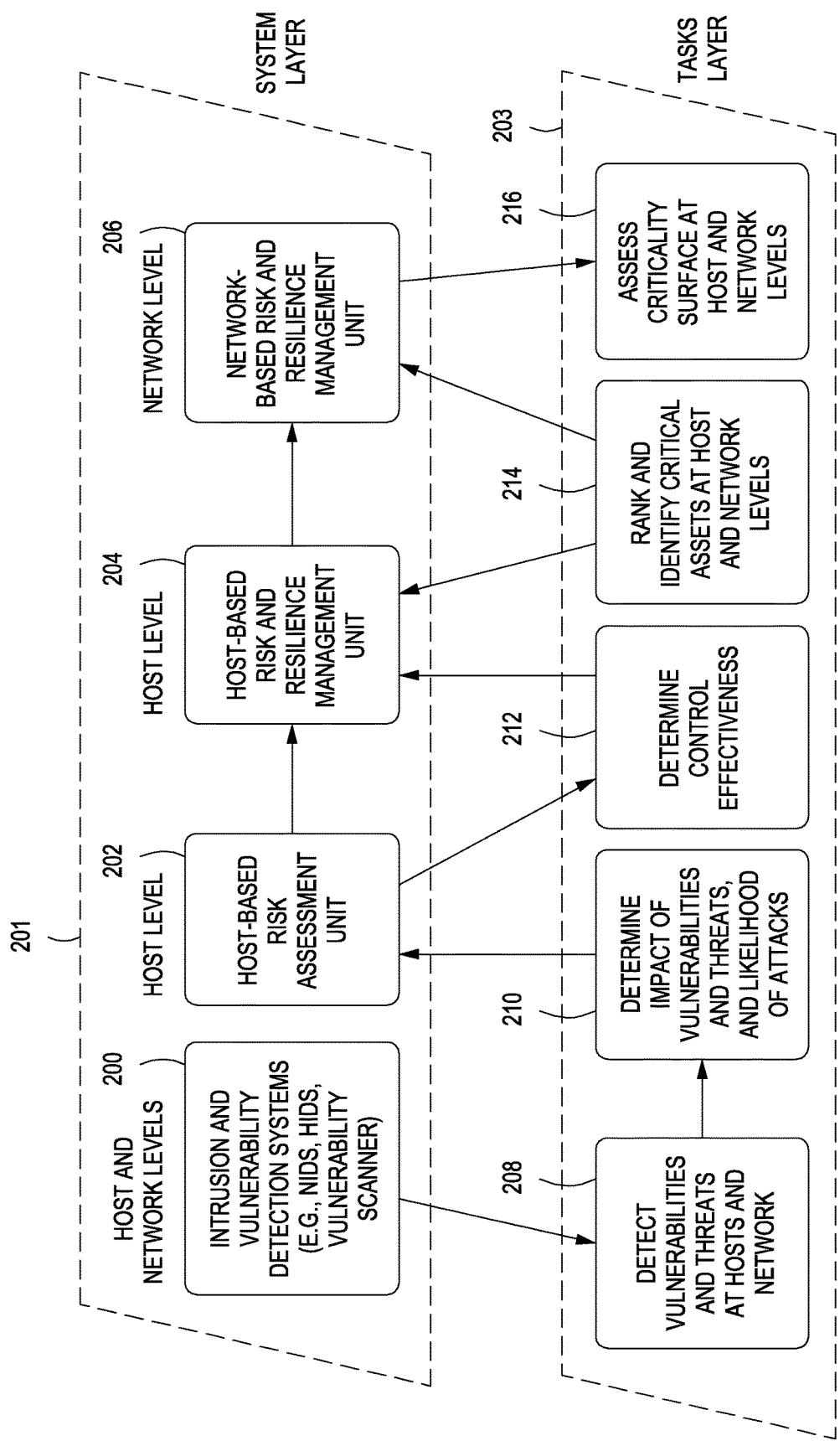
FIG. 2 depicts a two-layer diagram illustrating the interactions of tasks and cyber systems in security control, resilience, and controllability collaboration (CRCC) in accordance with exemplary embodiments of the present invention.

FIG. 2 depicts a two-layer diagram illustrating the interactions of tasks and cyber systems in CRCC in accordance with exemplary embodiments of the present invention. A systems layer 201 is shown, comprising host and network levels 200, host level 202, host level 204 and network level 206. A tasks layer 203 is shown comprising tasks 208, 210, 212, 214, and 216. Task 208 assesses vulnerabilities by scanners, and to detect intrusions/threats by Host-Based Intrusion Detection System (HIDS) and Network-Based Intrusion Detection System (NIDS) systems, e.g., hosts and network levels 200. Then, the next task 210 determines impact of vulnerabilities and threats, computed using Common Vulnerability Scoring System (CVSS) scores and conditional probability tables associated with a Bayesian network. The results of this computation enable the calculation of risk using a Bayesian network by the risk assessment unit at host level 202. This risk score allows the extended Bayesian network to implement task 212 of determining effectiveness of control systems such as HIDS, NIDS and scanners, based on the available conditional probability tables associated with the Bayesian network.

Similarly, the same risk score, along with the control effectiveness score, is utilized by the host level 204 comprising host-based risk and resilience management systems, for better management of risk and resilience. In addition to these host-based tasks, task 214 and task 216 are performed, task 214 comprising ranking and identify critical assets at host and network levels, and task 216 comprising assessing criticality surfaces at the host and network levels 200 to identify and rank critical assets at the network level 206.

Finally, the units described in network level 206 implement task 216 of computing the criticality surface score at host and network levels 200 to help determine the aggregated value of various scores including, but not limited to, risk, control effectiveness, resilience, vulnerability, and threats. According to some embodiments, the computation of these scores is automated fully or partially, depending on the availability of the conditional probability tables associated with the Bayesian network, and the network connectivity information of hosts. In some embodiments, conditional probability tables for the Bayesian network are formed offline using a combination of various techniques and analyst's feedbacks, including (but not limited to) empirical approaches and simulations.

Figure 3:
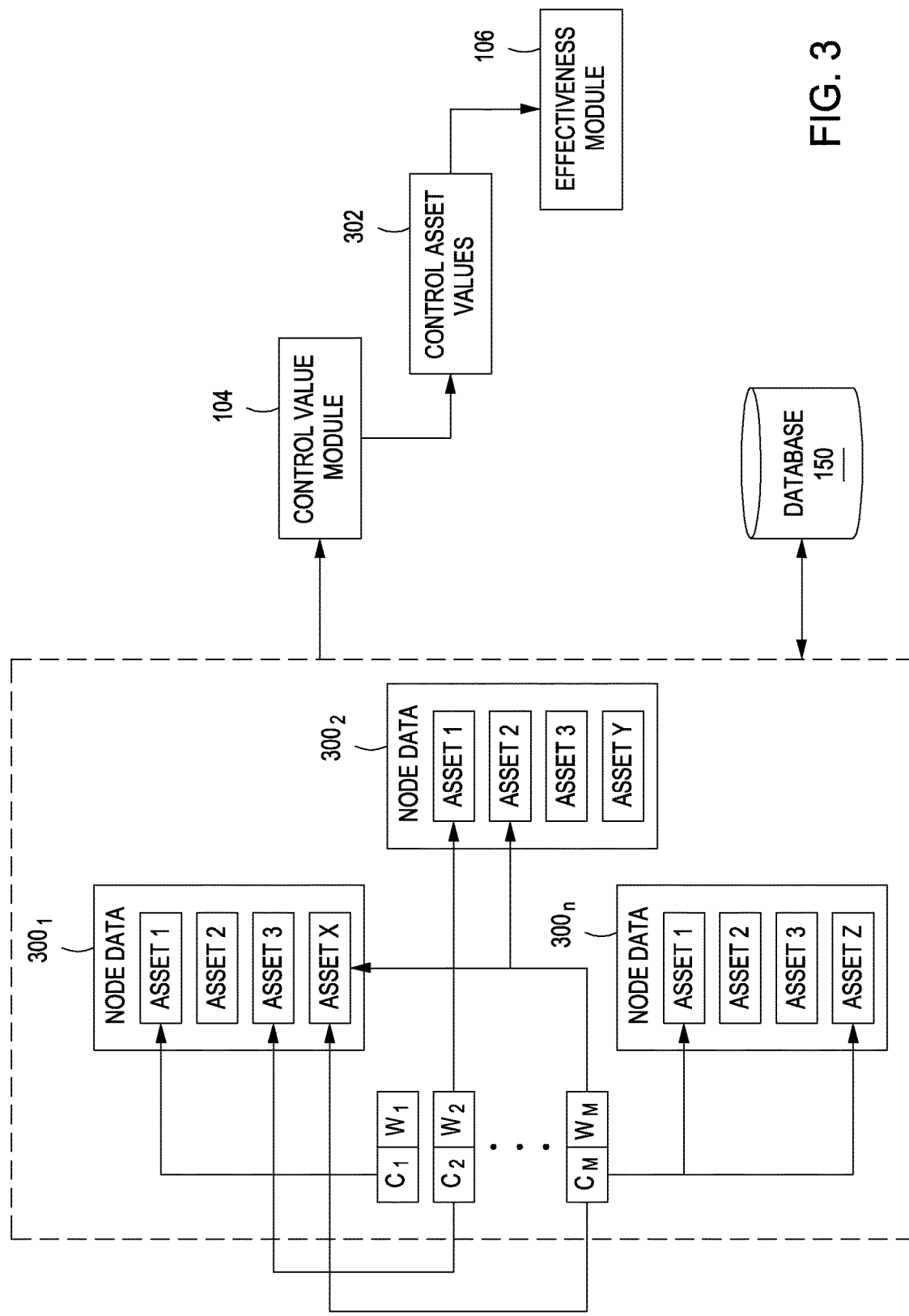
FIG. 3 depicts a block diagram of the control value module with control value $C_i$ and weight $w_i$ in accordance with exemplary embodiments of the present invention.

FIG. 3 depicts a block diagram of the control value module 104 in accordance with exemplary embodiments of the present invention. Sample node data $300_1$, $300_2$ to $300_N$ are shown, where node data is extracted from the database 150, or alternatively, obtained by scanning a network of nodes, such as nodes 101 shown in FIG. 1. The node data contains data regarding the assets for each node and the controls associated with each node asset. Each sample nodes may comprise a plurality of assets. For example, node $300_1$ has assets 1 to X, node $300_2$ has assets 1 to Y, and node $300_N$ has assets 1 to Z. The set of controls comprise $C_1$ to $C_M$, each having a weight, $W_1$ to $W_M$. The weights indicate how important a particular control is to the security of the associated asset. The weights may also be stored in database 150, either being manually predetermined or determined according to an algorithm. The control value module 104 computes the control asset values 302 for each node by multiplying the weight $W_M$ of a control mechanism $C_M$ by a 1 (if the node contains the asset) or a 0 (if the node does not contain the asset) and sums the product for each control mechanism. For example, weighted values and control mechanisms are shown in the following table:

TABLE 1

| Control Mechanisms | Weight | Node 1 assets | Node 2 assets | Node 3 assets |
|---|---|---|---|---|
| Signature-based NIDS | 0.7 | 0 | 1 | 0 |
| Host-based IDS | 0.8 | 1 | 1 | 1 |
| Anomaly-based IDS | 0.6 | 1 | 1 | 0 |
| Scanner | 0.4 | 0 | 1 | 1 |
| Firewall | 0.6 | 0 | 0 | 1 |
| Encryption | 0.7 | 0 | 1 | 1 |
| weighted asset value: | | 1.4 | 3.2 | 2.5 |

According to table 1, the weighted asset value for node 1 assets is 1.4, because Node 1 comprises only a host-based IDS and an anomaly based IDS, while Node 2 comprises all of the listed control mechanisms except a firewall. Together, the weighted asset values compose the control asset values 302 which are coupled to the effectiveness module 106.

Figure 4:
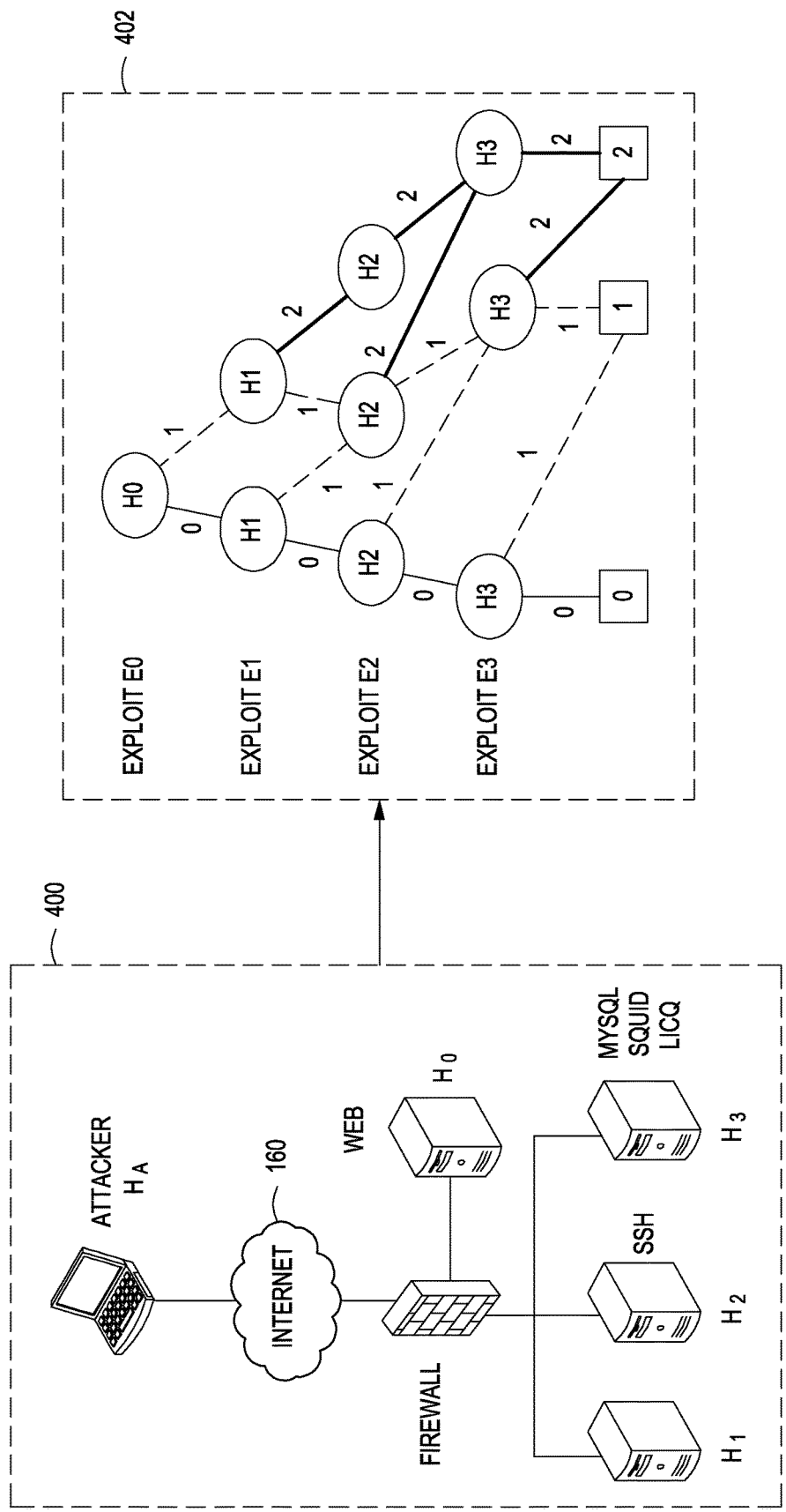
FIG. 4 depicts a diagram of a sample network in accordance with exemplary embodiments of the present invention using a multiple-valued decision diagram for computing the probability that the system's vulnerabilities are exploited by multistage attacks.

CVSS is generally used as a standard method to assess the severity level of vulnerabilities by assigning a severity score from 0 to 10. In one embodiment of the present invention, the probability that the vulnerability of a host is exploited by a multistage attack, where the exploitation of a host's vulnerability may depend on the exploitation of other hosts' vulnerabilities. To describe this method, a sample network 400 is shown in FIG. 4 with four host machines, namely, $H_0$, $H_1$, $H_2$, and $H_3$. A vulnerability of host $H_k$ can be exploited by either a single-stage attack (direct attack) or a multi-stage attack in the sense that exploitation of host $H_{k-1}$ may trigger the exploitation of $H_k$, due to the dependability between them. If a host is not exploited at all, it will be in normal operational state. A multiple value decision diagram 402 is generated by the computer system 120 based on the attacker and hosts shown in network diagram 400.

Diagram 402 is a multiple-valued decision diagram with three terminal nodes of 0, 1, and 2 shown in square boxes at the bottom of the diagram. Each circle in diagram 402 represents a host's state. Each circle has at most three outgoing edges labeled three logic values 0, 1, and 2: (i) the edge labeled with 0 indicates that $H_k$ is not exploited by any attack; (ii) the edge labeled with 1 indicates that $H_k$ is exploited by a single-stage attack or exploit $E_k$; and (iii) the edge labeled with 2 indicates that $H_k$ is exploited by a multi-stage attack $E_k$. For instance, the host $H_0$ has two outgoing edges with labels 0 and 1; it does not have an edge with label 2 because at least two dependent nodes should be exploited in sequence to indicate that an attack is a multi-stage attack. If a host's state indicates that it receives an incoming multistage attack (with label 2), then its only outgoing edge corresponds to a multistage attack. The types and number outgoing links of circles may depend on various factors, including dependencies, topology, and environmental conditions of hosts. The multiple-valued decision diagram 402 has three terminal nodes 0, 1, and 2 shown in square boxes that correspond to the output states of the system. The output states help compute the operational status of the system's outputs once the edges of the diagram are assigned probabilities and their truth table with function(s) is determined. The relationships among the host vulnerabilities and exploitations dictate how to draw the multiple-valued decision diagrams and to define functions of the truth table, as shown below:

TABLE 2

| $H_0$ | $H_1$ | $H_2$ | $H_3$ | $f_0$ | $f_1$ | $f_2$ |
|---|---|---|---|---|---|---|
| 0 | 0 | 0 | 0 | 1 | 0 | 0 |
| 0 | 0 | 0 | 1 | 0 | 1 | 0 |
| 0 | 0 | 1 | 1 | 0 | 1 | 0 |
| 0 | 1 | 1 | 1 | 0 | 1 | 0 |
| 1 | 1 | 1 | 1 | 0 | 1 | 0 |
| 0 | 0 | 1 | 2 | 0 | 0 | 1 |
| 0 | 1 | 1 | 2 | 0 | 0 | 1 |
| 1 | 1 | 1 | 2 | 0 | 0 | 1 |
| 1 | 1 | 2 | 2 | 0 | 0 | 1 |
| 1 | 2 | 2 | 2 | 0 | 0 | 1 |

Where, $f_0(1)$ is the probability that the system is not exploited, $f_1(1)$ is the probability that the system is exploited by some single-stage attack(s) and $f_2(1)$ is the probability that the system is exploited by some multi-stage attacks. The probability that a node's vulnerabilities are exploited by multistage attacks is defined as the sum of the probabilities of all paths towards the terminal node 2 in decision diagram 402. Each path's probability is equal to the product of all its edges, e.g. $P(H_0=0) \times P(H_1=0) \times P(H_2=1) \times P(H_3=2) + P(H_0=0) \times P(H_1=1) \times P(H_2=1) \times P(H_3=2) + P(H_0=1) \times P(H_1=1) \times P(H_2=1) \times P(H_3=2) + P(H_0=1) \times P(H_1=1) \times P(H_2=2) \times P(H_3=2) + P(H_0=1) \times P(H_1=2) \times P(H_2=2) \times P(H_3=2)$. The probability information and the number of exploits is used to determine the collateral damage and adjusted impact equations of the environmental category of CVSS, which is used in the calculation of the entries of the conditional probability tables shown in FIG. 5B.

Figure 5A:
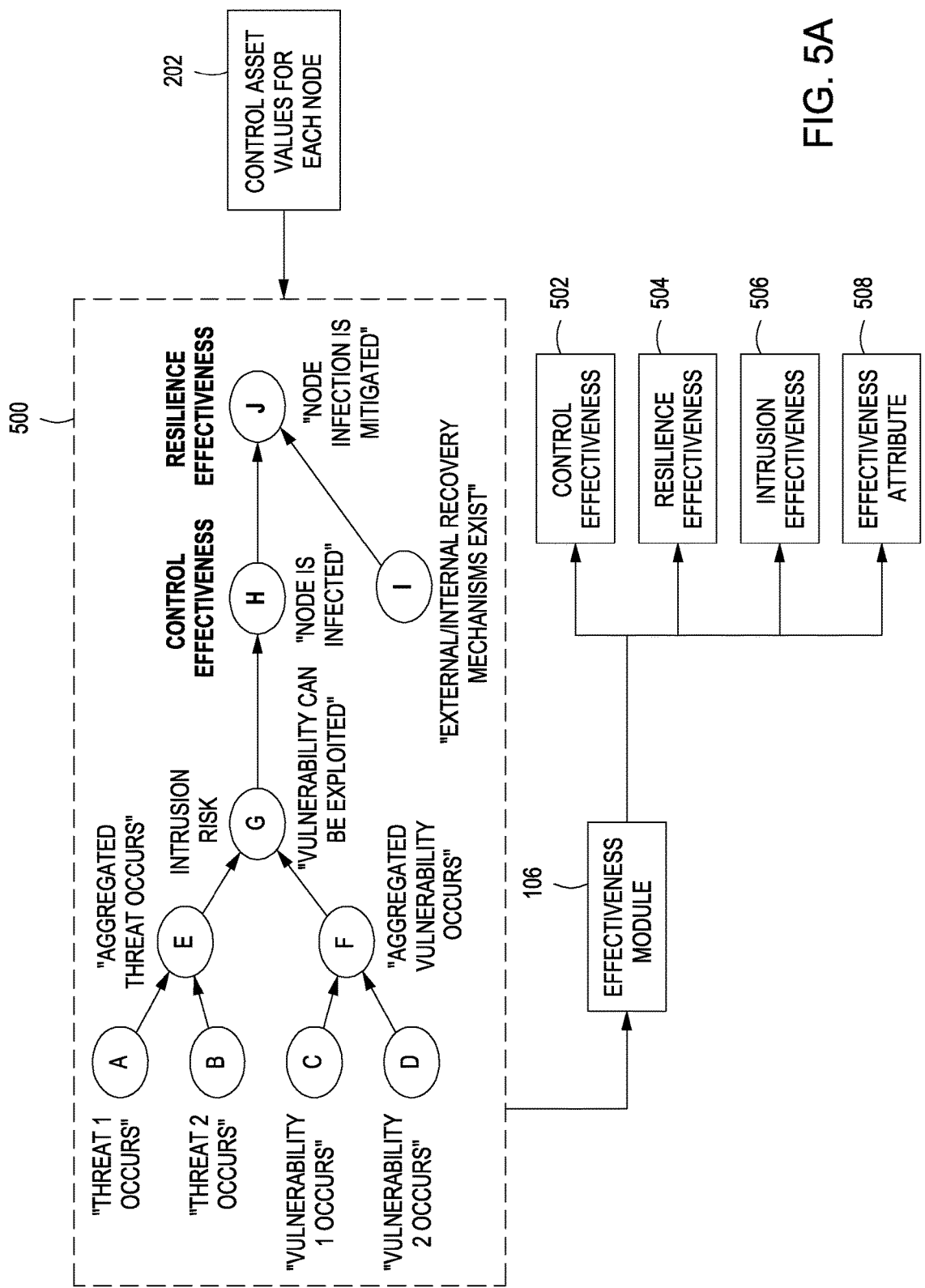
FIG. 5A depicts a block diagram of the effectiveness module 106 in accordance with exemplary embodiments of the present invention.

FIG. 5A depicts a block diagram of the effectiveness module 106 in accordance with exemplary embodiments of the present invention. Risk assessment is based on the scoring of vulnerabilities. In this regard, the Security Content Automation Program (SCAP), developed by the National Institute of Standards and Technology (NIST), supports the National Vulnerability Database (NVD) which provides a repository for known vulnerabilities and software that contains these vulnerabilities. As part of SCAP, the Common Vulnerability Scoring System (CVSS) provides a score for each new software vulnerability discovered that prioritizes the importance of the vulnerability. Once vulnerabilities and exploits are scored, a Bayesian network is one commonly used technique to perform risk assessment, though the present invention is not limited as such. Bayesian networks (or Belief networks) are graphical models representing the probabilistic relationships among a set of variables under uncertainty. According to one embodiment of the present invention, a Bayesian network is used to integrate risk assessment with determining the effectiveness of control defense systems and resilience mechanisms of an individual host machine in the plurality of nodes 101. In the Bayesian network, represented as a directed graph, the graph nodes represent random variables, and edges show dependencies among nodes that represent the cyber assets of an individual host machine (e.g., a node) from the nodes 101.

According to one embodiment, the control asset values 302 from the control value module 104 are used to form a Bayesian network 500, which includes random variables to integrate the measurement of risk with the effectiveness of control, resilience and recovery attributes of cyber assets. Each random variable corresponds to an event whose expression is enclosed within quotation marks, as shown in FIG. 5A. The (prior) probability definitions of the graph nodes in the Bayesian network 500 are defined as follows:

P(A), P(B): probability that node receives various threats.
P(C), P(D): probability that node has vulnerabilities that can be exploited by threats.
P(E): probability that node receives aggregated threat.
P(F): probability that node has aggregated vulnerabilities that can be exploited by threats.
P(G): probability that vulnerability can be exploited at node.
P(H): probability that node is infected despite the presence of control mechanisms.
P(I): probability that node has proper internal/external recovery mechanisms for mitigating node's infection.
P(J): probability that node infection is mitigated.

FIG. 5B illustrates the conditional probability tables (CPT) of all random variables for a single network node from the plurality of nodes 101. The values shown in the CPT are determined based on real vulnerability and threat assessments.

In a Bayesian network, vertices represent the binary variables of system and the dependence relations among these variables are expressed in terms of conditional probabilities in conditional probability tables (e.g., CPT of FIG. 5B). Bayesian reasoning uses Bayes' theorem of $P(X|Y) = P(Y|X)P(X)/P(Y)$, where $P(X|Y)$ and $P(Y|X)$ are conditional probabilities of random variables X and Y that represents two events. Note that $P(X,Y) = P(X|Y)P(Y)$, and $P(X,Y) = P(Y|X)P(X)$, where $P(X,Y)$ is the probability that both events corresponding to variables X and Y have occurred. When this product rule is generalized by extending it to n variables, it is called the chain rule:

$$P(X_1, X_2, \ldots, X_n) = $$
$$P(X_1)P(X_2|X_1)P(X_3|X_1, X_2) \ldots P(X_n|X_1, X_2, \ldots, X_{n-1}) =$$
$$P(X_1) \prod_{i=2}^{n} P(X_i|X_1, \ldots, X_{i-1})$$

The conditional independence relationship encoded in the Bayesian network 500 indicates that a node is independent of its ancestors, given its parents. Note that this conditional independence relationship does not fit the fact that host machines in nodes 101 may have dependencies that can allow multi-stage attacks to occur. Accordingly, the Bayesian network 500 allows for the risk assessment of cyber assets of an individual host, rather than the risk assessment of a network of host machines. The ancestor/parent relationship in the Bayesian network 500 is expressed with respect to some fixed topological ordering of the nodes. If there is an arc or edge pointing from variable X to variable Y, X is said to be a parent of Y. For each variable, a CPT (e.g., CPT in FIG. 5B) is specified by considering the above conditional independence relationship between a node and its ancestors given its parents. The entries of a CPT can be computed by different means, including CVSS scores for vulnerabilities, the occurrence probabilities of exploits or attacks, the individual asset values of a node with respect to its attributes of control, resilience, and recovery that can be obtained through techniques similar to the one described with regard to FIGS. 3-4.

Once all CPTs in FIG. 5B are determined as the prior joint distributions of the variables, the posterior joint distribution can be computed using the fundamental assumption of Bayesian network: the product of all CPTs is equal to the posterior joint distribution of the variables. Every time the state of a node changes due to a change on the value of its variable, the joint distribution is updated through the iterative application of Bayes' theorem. The (posterior) joint probability distribution as well as the intrusion risk, control effectiveness, and resilience effectiveness are computed as follows:

$$P(A,B,C,D,E,F,G,H,I,J)=P(A)\ P(B)\ P(C)\ P(D)\ P(E|A,B)\ P(F|C,D)\ P(G|E,F)\ P(H|G)\ P(I)\ P(J|H,I).$$

Intrusion Risk:

$$P(G=\text{True})=\Sigma_{A,B,C,D,E,F\epsilon(T,F)}P(G=\text{True},A,B,C,D,E,F).$$

Control Effectiveness:

$$P(H=\text{False})=\Sigma_{A,B,C,D,E,F,G\epsilon(T,F)}P(H=\text{False},A,B,C,D,E,F,G).$$

Resilience Effectiveness:

$$P(J=\text{True})=\Sigma_{A,B,C,D,E,F,G,H,I\epsilon(T,F)}P(J=\text{True},A,B,C,D,E,F,G,I).$$

FIG. 6 depicts a block diagram of the ranking module 108 in accordance with exemplary embodiments of the present invention. The effectiveness module 106 shown in FIG. 5A produces the effectiveness attributes 600. The effectiveness attributes 600 are coupled to the ranking module 108 in order to rank cyber assets of nodes in the plurality of nodes 101. The ranking is performed with the aid of the weighting and threshold data 604 retrieved from the database 150.

According to one embodiment, the ranking module 108 implements an enhanced Technique for Order of Preference by Similarity to Ideal Solution (TOPSIS), named enhanced TOPSIS (eTOPSIS), for more accurate ranking of cyber assets in accordance with their attributes by introducing weighting and threshold data 604, along with more realistic positive and negative ideal benchmarks. Instead of using a single weight for any normalized value of assets as in TOPSIS, multiple weights are used by the ranking module 108 to help maximize the distance from the negative ideal solution. For instance, when multiple weight values are used, the higher weight value is assigned when the normalized (positive) asset value gets higher than a normalized asset threshold T. A sensitivity analysis is performed for the number and values of weights and thresholds in order to determine their impact on the ranking outcome 602.

According to one embodiment of the present invention, (1) T represents the desirable minimum normalized asset value, (2) $w_{i1}$: weight of attribute i for those normalized asset values that are equal or greater than T, and (3) $w_{i2}$: weight of attribute i for those normalized asset values that are less than T. The weighted normalized asset value of a node for an attribute i is calculated by multiplying the normalized asset value with either $w_{i1}$ or $w_{i2}$, depending on whether the normalized asset value is less than T or not. Accordingly:

weighted normalized asset value=$w_{i1}$×(those normalized asset values that are equal or greater than T), and  (1)

weighted normalized asset value=$w_{i2}$×(those normalized asset values that are less than T).  (2)

In dynamic environments, it is preferred to have a fixed baseline for each of the positive ideal and negative ideal so that the amount of computation is reduced due to any changes on the assets and addition/deletion of nodes. Benchmark positive ideal and benchmark negative ideal are used for zenith and nadir solutions, respectively:

benchmark positive ideal for attribute $i=w_{i1}$×(desirable maximum normalized asset value for attribute i), and  Formula (1)

benchmark negative ideal for attribute $i=w_{i2}$×(minimum allowed normalized asset value for attribute i).  Formula (2)

According to one example, three nodes, three main attributes (i.e., control, resilience, and influence), two weights (i.e., $w_{i1}$ and $w_{i2}$) for each attribute i, and the threshold T of value 2 are considered. Given that (1) the desirable maximum normalized asset value for every attribute equals 5, and (2) the minimum allowed normalized asset values for attributes of control, resilience, and influence are 4/3, 1.5, and 0.5, respectively, the benchmark positive ideal and negative ideal are computed using the formulas introduced earlier. Because the desirable maximum normalized asset value equals 5 for every attribute, the benchmark positive ideal for the attributes of control, resilience, and influence are computed as (0.40×5=2), (0.30×5=1.5), and (0.25×5=1.25), respectively. Similarly, the benchmark negative ideal for the attributes of control, resilience, and influence are computed as (0.30×4/3=0.4), (0.20×1.5=0.3), and (0.20×0.5=0.1), respectively.

TABLE 3

| Attributes | $W_{i1}$ for n. asset value >= T | $W_{i2}$ for n. asset value < T = 2 | Node 1 normal. asset values | Node 2 normal. asset values | Node 3 normal. asset values | Weighted normalized asset values for node 1 | Weighted normalized asset values for node 2 | Weighted normalized asset values for node 3 | Bench. positive ideal | Bench. negative ideal |
|---|---|---|---|---|---|---|---|---|---|---|
| Control quality | 0.40 | 0.30 | 4 | 3 | 5 | 1.6 | 1.2 | 2.0 | 2.0 | 0.4 |
| Resilience quality | 0.30 | 0.20 | 2 | 3 | 1 | 0.6 | 0.9 | 0.2 | 1.5 | 0.3 |
| Influence on other nodes | 0.25 | 0.20 | 1 | 2 | 2 | 0.20 | 0.5 | 0.5 | 1.25 | 0.1 |

TABLE 3-continued

| Attributes | $W_{i1}$ for n. asset value >= T | $W_{i2}$ for n. asset value < T = 2 | Node 1 normal. asset values | Node 2 normal. asset values | Node 3 normal. asset values | Weighted normalized asset values for node 1 | Weighted normalized asset values for node 2 | Weighted normalized asset values for node 3 | Bench. positive ideal | Bench. negative ideal |
|---|---|---|---|---|---|---|---|---|---|---|
| | | | | | Distance to zenith | 1.44 | 1.25 | 1.50 | | |
| | | | | | Distance to nadir | 1.53 | 1.08 | 1.65 | | |
| | | | | | Relative closeness | 0.515 | 0.463 | 0.524 | | |

The Example is shown in Table 3, where for node 1, the weighted normalized asset values are calculated as (0.40× 4=1.6), (0.30×2=0.6), and (0.20×1=0.2), so that the entries for the column of weighted normalized asset values become 1.6, 0.6, and 0.2 from top to bottom. For node 1, distances to zenith and nadir and then relative closeness are computed as follows.

Distance to zenith: $D_1^+ = \sqrt{(1.6-2)^2+(0.6-1.5)^2+(0.2-1.25)^2} = 1.44$

Distance to nadir: $D_1^- = \sqrt{(1.6-0.4)^2+(0.6-0.3)^2+(0.2-0.1)^2} = 1.53$

Relative closeness: $C_1 = 1.53/(1.53+1.44) = 0.515$

As per the relative closeness values of nodes in Table 3, nodes are ranked as node 3, node 1, and node 2, in terms of the aggregated values of attributes of control quality, resilience, and influence, where node 3 has the highest rank. Accordingly in this example, the ranking outcome 602 would rank node 3 first, node 1 second and node 2 third.

Figure 7:
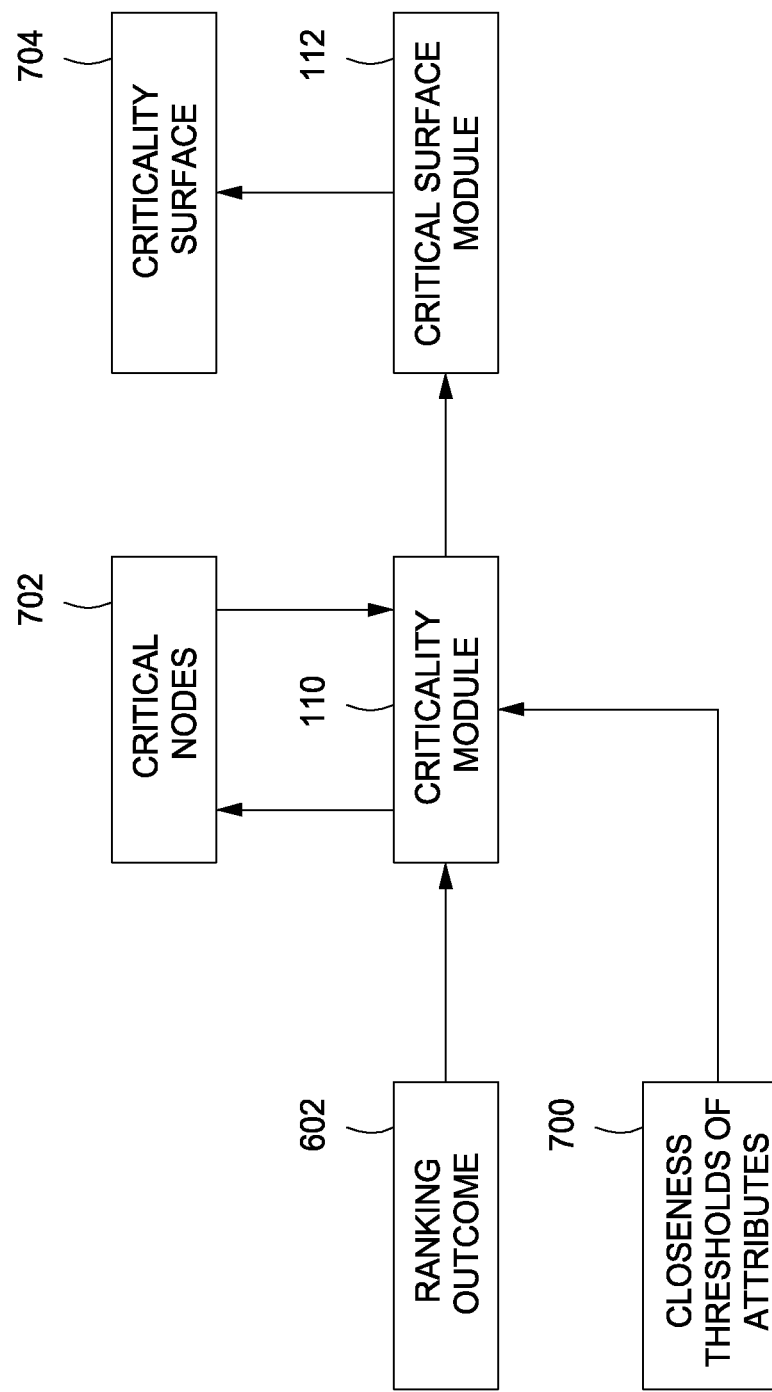
FIG. 7 depicts a block diagram of the criticality module in accordance with exemplary embodiments of the present invention.

FIG. 7 depicts a block diagram of the criticality module 110 in accordance with exemplary embodiments of the present invention. The criticality module 110 receives the ranking outcome 602 and a closeness threshold of attributes 700 and determines the critical nodes 702 from the nodes 101. The criticality module 110 then transmits the critical nodes to the criticality surface module 112. The criticality surface 704 is computed for the critical nodes 702 by the criticality surface module 112.

The critical nodes 702 are determined by examining the ranking outcome 602 and building, according to one embodiment, a hierarchically well-separated tree with Attributes (HSTA) out of the plurality of nodes 101, which depends on a number of hops between each node in addition to the attributes of each node. The HSTA considers multiple attributes such as control, resilience and recovery, in the process of nominating critical nodes. Multiple node attributes are ranked as primary attributes, secondary attributes, tertiary attributes, and the like. During the ancestor nomination process, the primary attribute values of nodes are considered first for comparison and nomination. If the primary attribute values of two nodes happen to be very close to each other according to its threshold, then the next high-ranking attribute (i.e., secondary attribute) values of these two nodes are compared to break the tie. This tie-breaking process is applied until the tie is broken.

For each attribute k, a "closeness" threshold $T_k$ is used to determine when any two nodes have the same attribute value, e.g., if the difference between two adjacent values of an attribute is equal or smaller than the attribute's threshold, then these two values are assumed to be the same. During the ancestor nomination process of nodes, if such two values of an attribute happen to the numbers to be compared, then they are considered the same. To break the tie in such a case, the values of the next attribute in ranking are considered for ancestor nomination. If the tie cannot be broken by the lowest rank attribute either, one of these two nodes is chosen randomly. Let $T_r$, $T_c$, and $T_i$ denote the closeness thresholds of the resilience, control, and influence attributes, respectively. In this section, the attributes of resilience, control, and influence are ordered from highest to lowest, so that the primary attribute is the resilience attribute.

Those of ordinary skill will recognize that an α-HST is defined as a rooted weighted tree such that (i) the edge weights from the root to leaf decrease by a factor of a, (ii) all root-to-leaf paths have the same hop distance, and (iii) the weights from each node to its children are the same. The criticality module 112 implements, according to one embodiment, a critical node algorithm (CN) with α-HST where α=2. The CN constructs a 2-HSTA from its leaves level towards the root level, by assuming that all the nodes of a given network initially form the leaves level of the tree. If the leaves are denoted level by level, then the 2-HSTA starts determining the level 1 ancestors, and keeps building the tree towards the root node.

The CN algorithm takes as input a network of nodes, each having three attribute values, namely, resilience, control, and influence ranked from highest to lowest. The CN algorithm outputs the most critical nodes of the network with respect to three attributes and network hop distances.

Figures 8A, 8B:
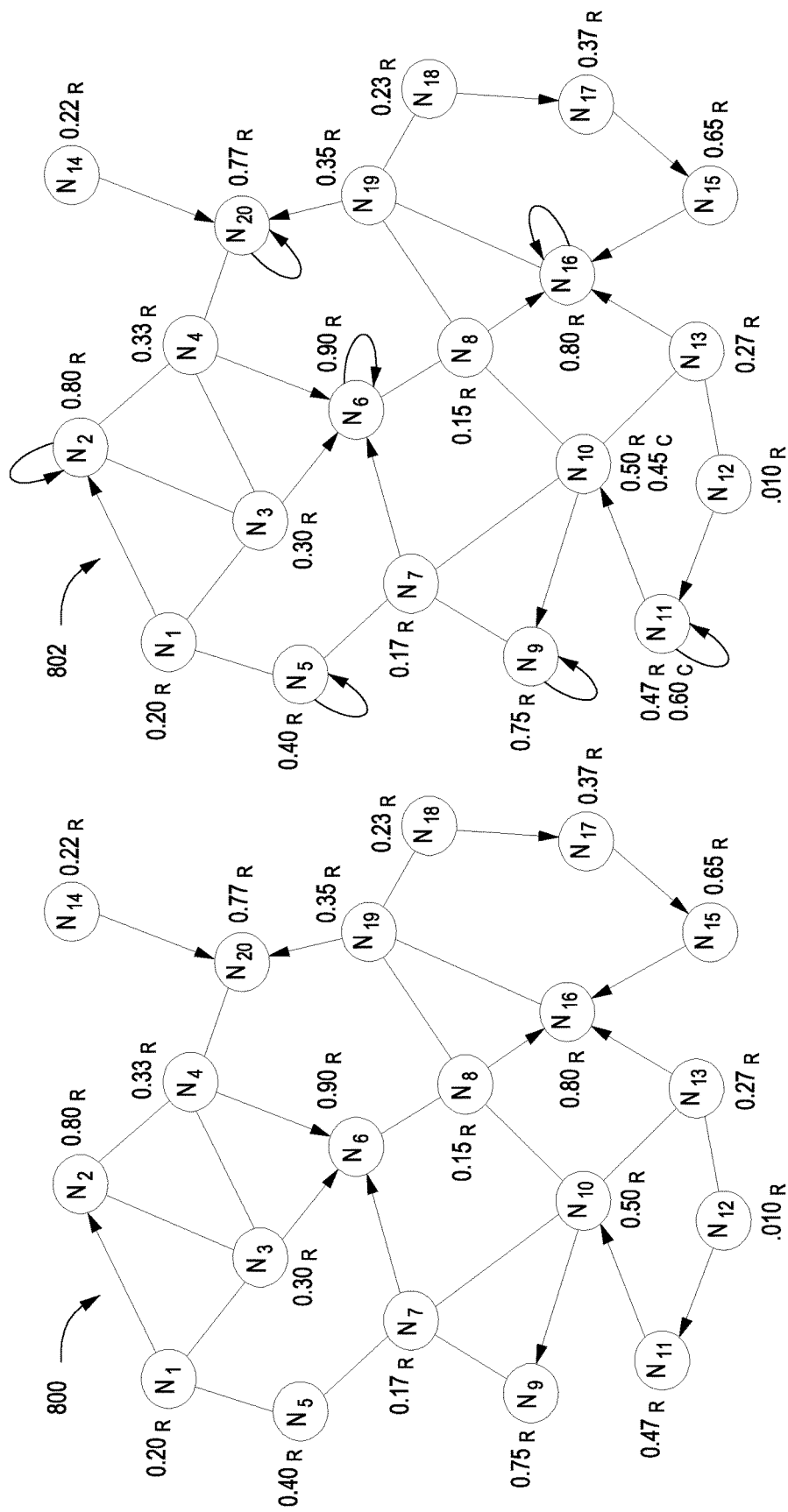
FIGS. 8A-8D depict a network of nodes with an iterative process of selecting critical nodes in accordance with exemplary embodiments of the present invention.
Figure 9:
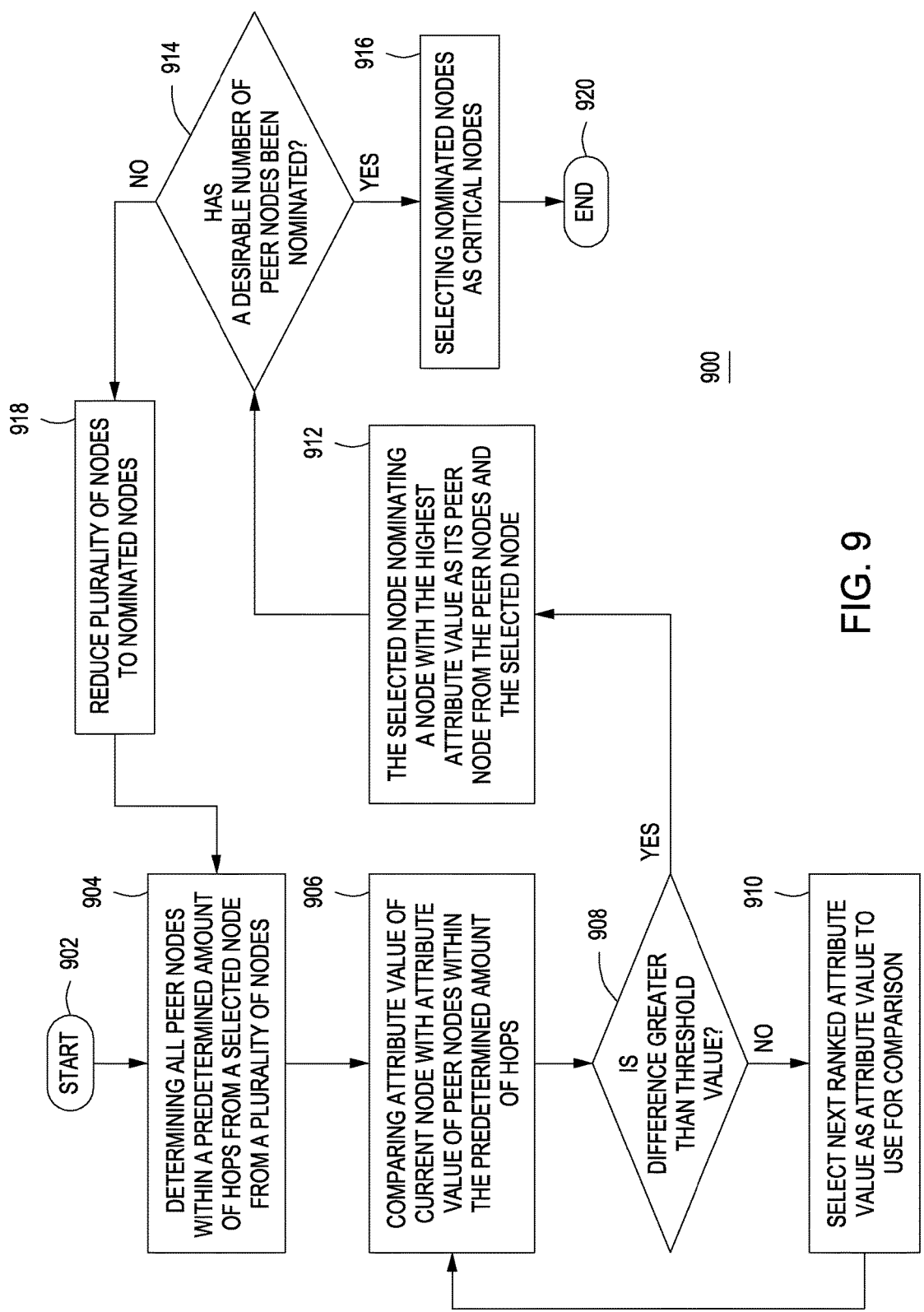
FIG. 9 depicts a flow diagram illustrating the critical node algorithm described with respect to FIG. 7, which operates on the network of nodes shown in FIGS. 8A-8D.

FIG. 9 depicts a flow diagram illustrating the method 900 (CN algorithm) described with respect to FIG. 7, which operates on the node network 800 shown in FIG. 8A. Each node has a primary attribute value shown, though those of ordinary skill in the art will recognize that secondary and tertiary attribute values are used for "tie-breaking". The method 900 is performed by the criticality module 110 and executed by the computer system 120 shown in FIG. 1.

Let α=2, β=1, and ρ=0, . . . , ⌈log$_2$N⌉. Let $T_r$, $T_c$, and $T_i$ denote the closeness thresholds of the resilience, control, and influence attributes, respectively. The method begins at step 902 and proceeds to step 904. At step 904, each candidate node floods up to $2^p\beta$ hops distance to determine all its potential ancestor peer nodes. At step 906, the primary attribute value of the current node is compared with the primary attribute values of potential ancestor peer nodes within the predetermined amount of hops from the selected node. If, at step 908, the difference between the attribute values is less than, or equal to, a threshold value the method proceeds to step 910, where the next ranked attribute value is used for comparison in step 906, until the difference is greater than the threshold value at step 908. If the tie is not broken between two nodes, one of the nodes being compared is chosen at random. Subsequently, the method proceeds to step 912, where the selected node nominates the peer node with the highest attribute value as its ancestor node, from amongst the potential ancestor peer nodes.

The method proceeds to step 914, where it is determined whether a desirable number of ancestor peer nodes have been nominated. If a desirable number of nodes are not nominated yet, the method proceeds to step 918, where the plurality of nodes is reduced to only the currently nominated nodes. The method then proceeds to step 904 to repeat the process. However, if at step 914, it is determined that a desirable number of steps have been nominated, the method proceeds to step 916, where the nominated nodes are selected as the critical nodes. The method terminates at step 920.

According to one example process depicted in FIGS. 8A-8D, given the nodes and the attribute values shown in FIG. 8A, a 2-HSTA is constructed for the 20-node network 800 by assuming that all the nodes of the network initially form the leaves level of the 2-HSTA. Let $T_r=0.05$, $T_c=0.1$ and $T_i=0.08$. Only the resilience attribute values that range from 0.1 to 1.0 are shown with subscript R in 800, where 1.0 is the highest desirable attribute value. In the first iteration (i.e., p=0) of the for loop in Algorithm CN, each candidate node floods 1 hop, compares resilience values, and then choose the highest resilience value as its level 1 ancestors (node labels in blue) if the difference of their resilience values is greater than $T_r=0.05$; otherwise, consider their control values.

Figures 8C, 8D:
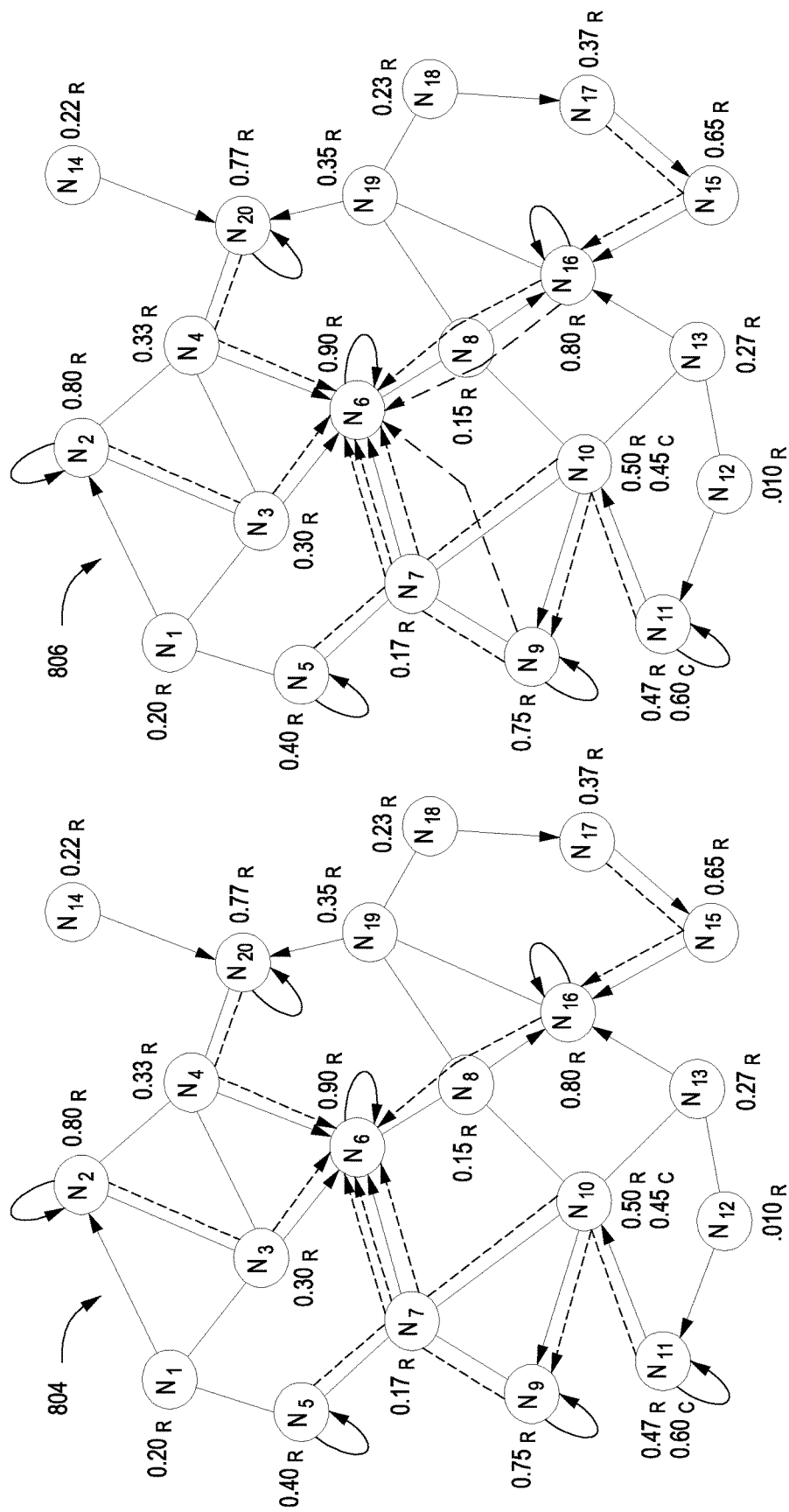

For instance, note that the difference of the resilience values of $N_{10}$ is $N_{11}$ is less than $T_r=0.05$. Therefore, their control attribute values (i.e., 0.60 and 0.45) need to be compared, which causes $N_{11}$ to nominate itself rather than $N_{10}$. At the end of iteration 1, the nominated ancestor nodes of level 1 are $N_2$, $N_5$, $N_6$, $N_9$, $N_{11}$, $N_{15}$, $N_{16}$, $N_{17}$, and $N_{20}$ as shown in graph 802 (FIG. 8B). In the second iteration (i.e., p=1) and third iteration (i.e., p=2) of the for loop in Algorithm CN, each candidate node floods up to 2 hops and 4 hops, respectively, as shown in graphs 804 (FIG. 8C) and 806 (FIG. 8D). At the end of the second iteration, the nominated ancestor nodes of level 2 are $N_6$, $N_9$, and $N_{16}$, while only $N_6$ is nominated as an ancestor node at level 3, e.g., graph 806 (FIG. 8D). Accordingly, the method selects node $N_6$ as one of the most critical nodes. Accordingly, the network connectivity information integrated with the information of attributes in identifying the critical nodes of a network at every round of method 900.

Figure 10:
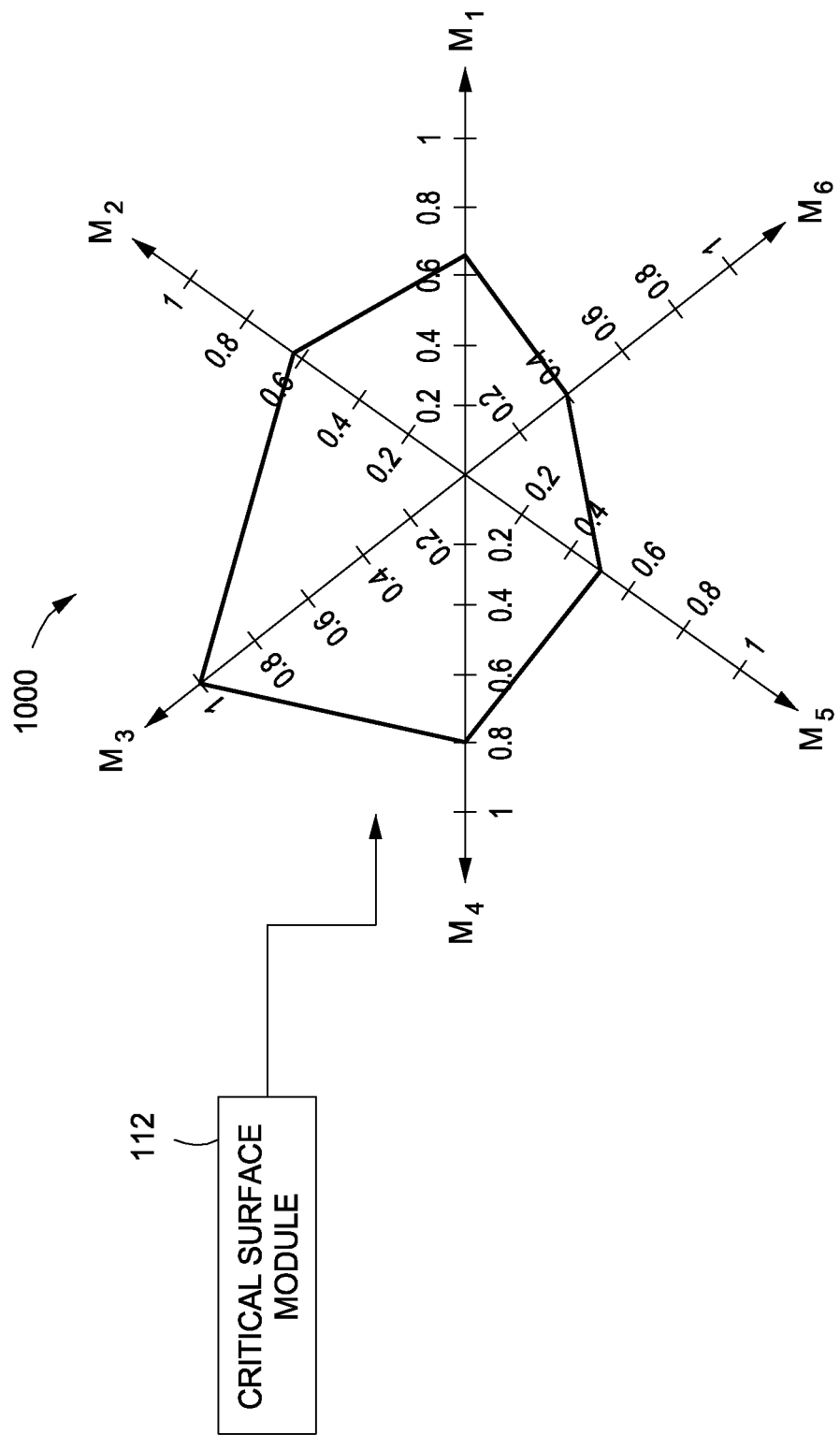
FIG. 10 illustrates a polygon formed using a criticality surface of multiple metrics in accordance with exemplary embodiments of the present invention.

FIG. 10 illustrates a polygon 1000 formed using the criticality surface 704 in accordance with exemplary embodiments of the present invention. The criticality surface 704 is generated by the critical surface module 112, which receives the critical nodes from the criticality module 110. The criticality surface is used to compute the aggregated value of all metrics deemed important in determining criticality of assets over a network. The criticality surface of an asset or network is quantified by computing the area of a polygon whose vertices' coordinates are calculated by the values of the metrics and scores (e.g., risk, resilience, control effectiveness, threat, vulnerability, node connectivity, influence, interoperability). This polygon is shown as an equiangular polygon 1000 in FIG. 10. Polygon 1000 is formed considering, for example, six metrics, $M_1$ to $M_6$. In one embodiment, $M_1$ is risk, $M_2$ is resilience, $M_3$ is control, $M_4$ is influence, $M_5$ is recovery, and $M_6$ is robustness. Each metric is formed on its own axis (or dimension), with an angle of 60 degrees separating the axes. The separation angle is determined as 360 degrees divided by "i", where "i" is the number of metrics considered important.

The criticality surface is computed determining the coordinates of the equiangular polygon, where the area of the polygon is determined according to the following formula:

$$\text{Area} = \tfrac{1}{2} \Sigma_{i=0}^{N-1} (x_i y_{i+1} - x_{i+1} y_i) \qquad \text{Eq. 5}$$

Considering a polygon with N−1 sides and N vertices ($x_i$, $y_i$), i=0 to N−1, such that the first vertex ($x_0$, $y_0$) and the last vertex ($x_N$, $y_N$) are the same.

Figure 11:
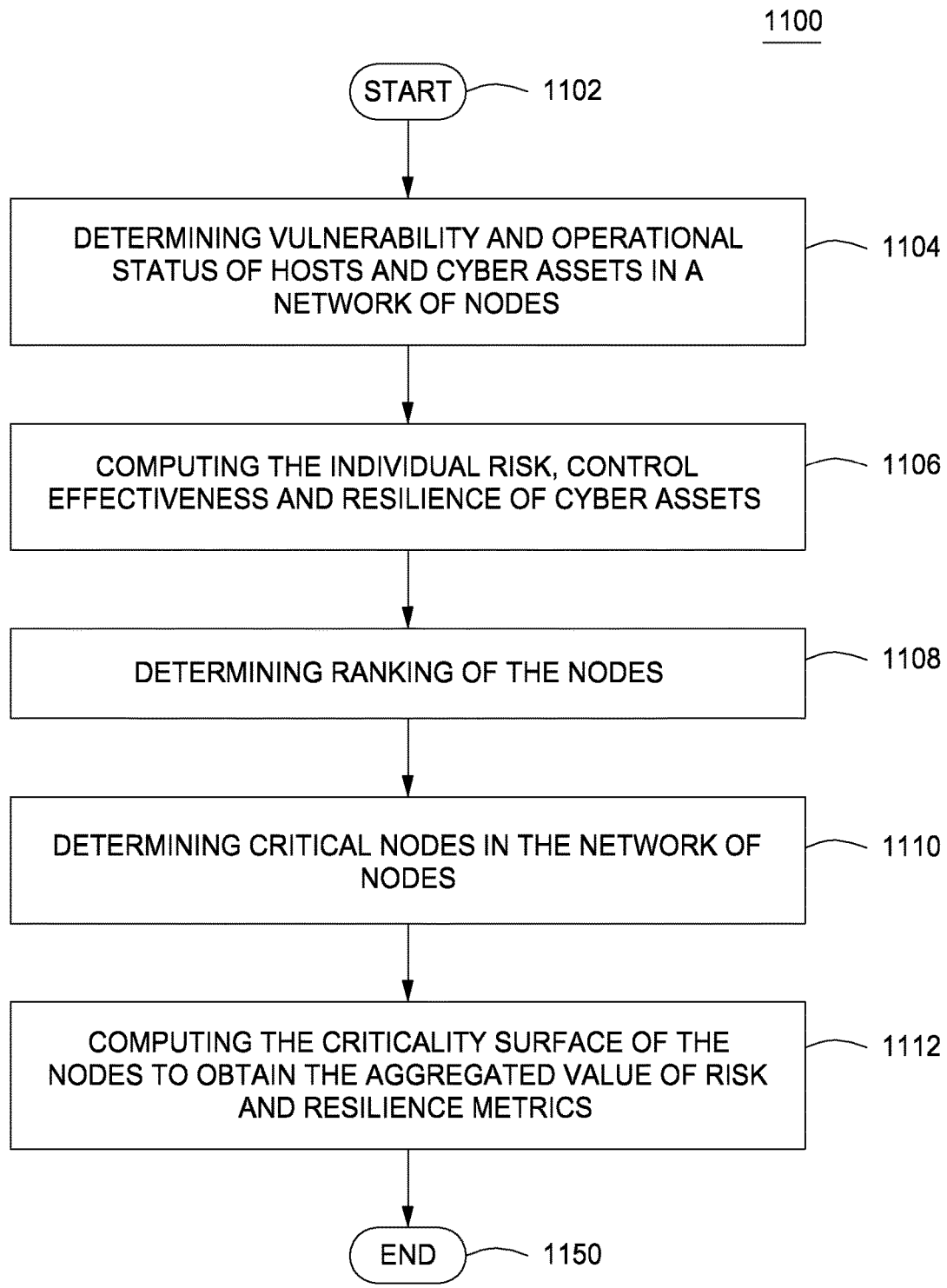
FIG. 11 depicts a flow diagram for a method for determining the aggregated value of risk and resilience metrics of critical nodes, in accordance with exemplary embodiments of the present invention.

FIG. 11 depicts a flow diagram for a method 1100 for determining the aggregated value of risk and resilience metrics of critical nodes, in accordance with exemplary embodiments of the present invention. The method 1100 is performed by the node criticality module 100, executed by the computer system 120.

The method begins at step 1102 and proceeds to step 1104, where control value module determines vulnerability and operational status of hosts and cyber assets of a one or more nodes. At step 1106, the effectiveness module 106 computes the individual control effectiveness and resilience of cyber assets, along with their risk, by representing them with additional random variables in a Bayesian network computing risk only. At step 1108, the ranking module 108 determines a ranking of cyber assets by considering control, resilience, and influence asset values of each node by improving the decision-making technique TOPSIS. Those of ordinary skill in the art will recognize that the assets may belong to a single host machine, or may be a plurality of assets each belonging to a node in a network of computer systems. At step 1110, the criticality module 110 determines the critical nodes of the plurality of nodes with respect to network connectivity and the attributes of resilience, control, and influence using, for example, an enhanced Hierarchically Well-Separated Tree. Finally at step 1112, the critical surface module 112 computes the criticality surface of cyber assets to obtain the aggregated value of risk and resilience metrics. The method terminates at step 1150.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A computer implemented method for determining aggregated value of risk and resilience metrics of critical nodes in a network of computer nodes, comprising:
   determining a status of each node in a plurality of nodes;
   computing one or more effectiveness attributes for each node in the plurality of nodes;
   ranking the plurality of nodes based upon at least the one or more effectiveness attributes of each node;

determining one or more nodes as critical nodes based on the ranking, wherein determining one or more nodes as the critical nodes comprises:
constructing a graph from the plurality of nodes and their connectivity to each other;
assigning multiple attributes to each node in the graph;
comparing the attributes of a selected node from the plurality of nodes to peer nodes;
selecting one of the potential ancestor nodes with a highest attribute value; and
determining one or more nodes as the critical nodes after a predetermined number of peer nodes is selecting; and
computing a criticality surface of the one or more critical nodes as the aggregated value of risk and resilience metrics, wherein the criticality surface is an aggregation of the one or more effectiveness attribute for each of the one or more critical nodes.

2. The method of claim 1, wherein determining a status of each node comprises considering an effect of one or more multi-stage attacks on each node.

3. The method of claim 2, wherein determining a status of each node further comprises:
determining a probability that a vulnerability of each node is exploitable by a multi-stage attack.

4. The method of claim 3, wherein determining a probability comprises:
determining a weighted asset value for each asset in a node of the plurality of nodes by:
retrieving weights for all assets from a database of assets and their corresponding weight;
determining assets available in a node; and
summing the weight of assets available in each node.

5. The method of claim 1, computing the effectiveness attributes further comprising:
constructing a probabilistic model based on the status of each node; and
determining, using the probabilistic model, a risk assessment for the one or more effectiveness attributes.

6. The method of claim 5, wherein the one or more effectiveness attributes comprise at least control effectiveness, resilience effectiveness and intrusion effectiveness.

7. The method of claim 1, wherein ranking the plurality of nodes comprises:
selecting an alternative from a plurality of alternatives closed to a positive ideal solution, and as far from a negative ideal solution as a predetermined threshold value, while considering multiple attributes.

8. The method of claim 7, further comprising considering multiple weights in distance calculation to maximize a distance from the negative ideal solution.

9. The method of claim 1, wherein the multiple attributes are ranked against each other.

10. The method of claim 9, wherein if equally ranked attributes of the selected node and a peer node have values that are equal or within a predetermined threshold, next lower ranked attributes are compared until an attribute value of one node is at least a predetermined threshold greater than the attribute value of another node.

11. The method of claim 10, further comprising:
selecting either the selected node or one of the peer nodes randomly if all equally ranked attributes have equal values.

12. The method of claim 11, wherein determining peer attribute values comprises moving a predetermined number of nodes away from the selected node.

13. The method of claim 1, wherein the method is performed $\log_2 N$ times, where N represents a size of the plurality of nodes.

14. The method of claim 1, wherein computing the criticality surface further comprises:
computing an area of a polygon, wherein the polygon comprises vertices formed for each metric considered as an important metric and mapped two-dimensionally.

15. An apparatus for determining aggregated value of risk and resilience metrics of critical nodes in a plurality of computer nodes, comprising at least one processor having a plurality of modules which include:
a control value module configured for determining a status of each node in the plurality of computer nodes;
an effectiveness module configured for computing one or more effectiveness attributes for each node in the plurality of nodes;
a ranking module configured for ranking the plurality of nodes based on at least the one or more effectiveness attributes;
a criticality module configured for determining one or more nodes as critical nodes based on at least the ranking of the plurality of nodes, wherein in determining one or more nodes as the critical nodes, the criticality module is configured to:
construct a graph from the plurality of nodes and their connectivity to each other;
assign multiple attributes to each node in the graph;
compare the attributes of a selected node from the plurality of nodes to peer nodes;
select one of the potential ancestor nodes with a highest attribute value; and
determine one or more nodes as the critical nodes after a predetermined number of peer nodes is selecting; and
a criticality surface module configured for computing a criticality surface of the one or more critical nodes as the aggregated value of risk and resilience metric, wherein the criticality surface is an aggregation of the one or more effectiveness attribute for each of the one or more critical nodes.

16. The apparatus of claim 15, the effectiveness module further configured for:
constructing a probabilistic model based on the status of each node; and
determining, using the probabilistic model, a risk assessment for the one or more effectiveness attributes.

17. The apparatus of claim 15, the ranking module further configured for:
selecting an alternative from a plurality of alternatives closed to a positive ideal solution, and as far from a negative ideal solution as a predetermined threshold value, while considering multiple attributes.

18. An apparatus for determining aggregated value of risk and resilience metrics of critical nodes in a plurality of computer nodes, comprising at least one processor having a plurality of modules which include:
a control value module configured for determining a status of each node in the plurality of computer nodes;
an effectiveness module configured for computing one or more effectiveness attributes for each node in the plurality of nodes;
a ranking module configured for ranking the plurality of nodes based on at least the one or more effectiveness attributes;

a criticality module configured for determining one or more nodes as critical nodes based on at least the ranking of the plurality of nodes and further configured for:
constructing a hierarchically well-separated Tree with attributes (HSTA) from the plurality of nodes and their connectivity to each other;
assigning multiple attributes to each node in the HSTA; and
comparing the attributes of a selected node from the plurality of nodes to potential peer nodes;
selecting one of the peer nodes with a highest attribute value; and
determining one or more nodes as the critical nodes after a predetermined number of peer nodes is selecting; and
a criticality surface module configured for computing a criticality surface of the one or more critical nodes as the aggregated value of risk and resilience metric, wherein the criticality surface is an aggregation of the one or more effectiveness attribute for each of the one or more critical nodes.

19. A non-transitory computer readable medium for storing computer instructions that, when executed by at least one processor causes the at least one processor to perform a method for determining aggregated value of risk and resilience metrics of critical nodes from a plurality of computer nodes, comprising:

determining a status of each node in a plurality of computer nodes;
computing one or more effectiveness attributes of each node in the plurality of nodes;
ranking the plurality of nodes based upon at least the one or more effectiveness attributes of each node;
determining one or more nodes as critical nodes based on the ranking, wherein determining one or more nodes as the critical nodes comprises:
constructing a graph from the plurality of nodes and their connectivity to each other;
assigning multiple attributes to each node in the graph;
comparing the attributes of a selected node from the plurality of nodes to peer nodes;
selecting one of the potential ancestor nodes with a highest attribute value; and
determining one or more nodes as the critical nodes after a predetermined number of peer nodes is selecting; and
computing a criticality surface of the one or more critical nodes as the aggregated value of risk and resilience metrics, wherein the criticality surface is an aggregation of the one or more effectiveness attribute for each of the one or more critical nodes.

* * * * *